Patented Apr. 25, 1933

1,906,163

UNITED STATES PATENT OFFICE

PERCY LASSELLE, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

PROCESS OF MAKING BASE EXCHANGE MATERIALS FOR WATER SOFTENING

No Drawing.  Application filed March 10, 1927.  Serial No. 174,429.

The present invention relates to base exchange materials or zeolites, now commonly used in the softening of water, and to methods of preparing the same.

An object of the invention is to provide a new process for the preparation of zeolites by the wet method. Another object is to provide zeolites which have extremely high capacity for base exchange and at the same time possess those desirable physical characteristics which are essential to industrial use. Capacity depends upon available surface and the gel zeolites made in the wet way have mostly a high total capacity because of their minutely pervious character. This internal surface may not, however, be quickly available because of the fineness of the pores, which are microscopic or sub-microscopic. In drying a gel containing a crystallizable salt, and particularly sodium sulphate, crystallization takes place and probably porosity due to crystal cavities is superadded to that normal to the gel. Surface thus produced should be more quickly available than that of the pores.

Practically all of the base exchange materials used in water softening are hydrated double silicates of an alkali metal and of one or more of the so-called heavy metals, such as iron or aluminum. Heretofore, it has been the practice in the preparation of sodium aluminum silicates to start with a solution of alkali metal silicate, such as sodium silicate and precipitate with a solution of either sodium aluminate or of an aluminum sulphate. In case sodium aluminate is used the alumina is derived from an alkaline solution of an amphoteric hydroxide, whereas when aluminum sulphate is used the alumina is obtained from a non-alkaline solution of an amphoteric hydroxide.

In producing gel-forming solutions from aluminum sulphate and sodium silicate, sodium sulphate is formed and occurs in the mother liquor while sodium aluminate with sodium silicate does not directly give rise to any substantial amounts of crystallizable salts in the mother liquor.

In making commercial zeolites by the wet way, the gel may be dried with mother liquor present and then washed. Some of the mother liquor may or may not be pressed out prior to drying. In the present invention this procedure of drying before washing may be followed. The washing removes salts which crystallized in drying, probably leaving crystal cavities.

Excellent results have been obtained by each of the above methods, but I have found that much superior zeolites are produced by deriving one portion of the alumina from an alkaline solution of an amphoteric hydroxide and the other portion from a non-alkaline solution of the hydroxide. I have further found that still better zeolites are produced if there be also added an acid, or caustic soda, or acid and caustic soda, as the case may be, in order to obtain the desired reaction of the mother liquor and in order to have sufficient crystallizable salts in the mother liquor.

In order that the invention may be better understood the following typical methods of procedure in accordance with the principles of the invention are given. It is to be understood that the invention is not limited to the preparation of zeolites from the specific materials described, but that this disclosure is given for purposes of exemplification only. It will be obvious to those skilled in the art that equivalent methods and materials may be used to accomplish substantially the same results.

An excellent product is obtained by mixing 25 liters of 1.2 normal sulphuric acid with a solution of 25 liters containing 66.7 grams per liter of aluminum sulphate (corresponding approximately to the formula $Al_2(SO_4)_3 \cdot 18 H_2O$). This mixture is then diluted to 75 liters after which it is mixed with 50 liters of a sodium silicate solution formed by diluting to that volume 10 liters of commercial sodium silicate having a density of 42° Bé. and containing 8.85 per cent $Na_2O$ and 28.68 per cent $SiO_2$.

With the foregoing solutions is mixed a solution of 125 liters of sodium aluminate containing 6.78 grams $Al_2O_3$ and 7.23 grams $Na_2O$ per liter. The sulphuric acid added and the aluminum sulphate both produce sodium sulphate which remains in solution in the mother liquor.

In spite of the presence of this sodium sulphate in the solution mixture, when the reagent solutions of about the concentrations named are mixed in the order specified a complete and uniform mixture is effected before gelling or precipitation takes place. This is advantageous in the subsequent formation of a gel structure. It is to be noted that in the above mixture, with the proportions stated, the aluminum sulphate and sulphuric acid supply 2.5 mols $Al_2O_3$ and 22.5 mols $SO_3$ while the admixed silicate supplies 20.1 mols $Na_2O$ and 67.3 mols $SiO_2$. The resulting solution mixture contains 20.1 mols $Na_2SO_4$, 67.3 mols $SiO_2$ and 2.5 mols $Al_2O_3$ with 2.4 mols $SO_3$. Addition to this mixture of the specified aluminate solution supplies thereto approximately 8.4 mols $Al_2O_3$ and 15 mols $Na_2O$, the final mixture then containing 22.5 $Na_2SO_4$, 12.6 $Na_2O$, 10.9 $Al_2O_3$, 67.3 $SiO_2$.

After the addition of the aluminate solution the mixture is permitted to set and in a very short time, usually 30 to 60 seconds, a stiff, firm, homogeneous jelly results. The jelly may be dried, without the removal of excess liquid by mechanical means, or it may be subjected to pressure in a hydraulic press or other appropriate means for expelling a portion of the liquid. In either case, the drying may be carried to the point where no further moisture can readily be removed, or the jelly may be dried only to the extent that it assumes a rigid gel structure. In the latter case, drying may be arrested and the soluble salts in the product washed out with water. It has been found preferable to carry on the drying at temperatures not exceeding 100° C.

To break up the dried mass of material, it may be put in water, whereupon it will be reduced to gel particles which are generally of the proper size for water softening. If smaller particles are desired they can be readily obtained by well-known mechanical operations.

Another method of producing zeolites in accordance with my invention comprises diluting 10 liters of commercial water glass solution, of the same grade as that used in the previous example, to 50 liters with water. To this silicate solution is added 5 liters of 0.6 normal sodium hydroxide solution, which is thoroughly mixed with the silicate solution.

With the above solution is mixed 30 liters of a solution containing 44.8 grams of commercial aluminum sulphate and 10.58 grams of $H_2SO_4$ per liter.

Before the mixture has an opportunity to set, 50 liters of sodium aluminate solution, containing 23.53 grams of $Na_2O$ and 16.9 grams of $Al_2O_3$ per liter is mixed with it.

The mixture is then permitted to set and, as was true in the first case cited, it will form a jelly in a very short time, which may be treated in the same manner to produce a dried gel as in the first illustration. In this example the silicate and caustic soda solutions contain 21.6 mols $Na_2O$ and 67.3 mols $SiO_2$ as against 9.3 mols $SO_3$ and 2 mols $Al_2O_3$ in the acidified aluminum sulphate solution which is mixed with the alkalized silicate; and the aluminate solution supplies 19 mols $Na_2O$ with 8.28 mols $Al_2O_3$. The final mixture contains 9.3 $Na_2SO_4$, 31.3 $Na_2O$, 10.3 $Al_2O_3$, 67.3 $SiO_2$.

Caustic soda is added to the sodium silicate solution with the object of increasing the ratio of the $Na_2O$ to the $SiO_2$ and to increase the amount of sodium sulphate which results from the chemical interaction of the caustic soda with the acid solution of aluminum sulphate. It has been found that in this way a much harder and more durable zeolite is obtained.

Alternative or equivalent methods of carrying out my invention, which, along with many others, will suggest themselves to those skilled in the art, comprise the use of metals other than aluminum in one or both steps of the process. Different proportions or concentrations of any or all of the reagents specified may be employed, such as dilute solutions, in which case the bulk of the mother liquid may be separated by filter pressing or other means. The acid or caustic soda, or both, may be omitted and a satisfactory product obtained.

In the examples cited above, the alumina in the final product is derived partly from aluminum hydroxide in alkaline combination and partly from aluminum hydroxide in non-alkaline combination. The terms "solution of an alkaline compound of an amphoteric hydroxide" and "solution of a non-alkaline compound of an amphoteric hydroxide" are used throughout the specification and claims to designate generically solutions such as sodium aluminate or zincate and aluminum or zinc sulphate respectively; and metals such as aluminum, zinc, etc. are referred to as amphoteric metals since they are capable of forming amphoteric hydroxides.

As a specific example of equivalent materials which may be used, potassium hydroxide may be employed instead of sodium hydroxide, potassium silicate for sodium silicate, hydrochloric acid for sulphuric, sodium zincate for sodium aluminate, zinc sulphate instead of aluminum sulphate. In the foregoing list no attempt has been made to give all of the equivalents, since many others will suggest themselves to those familiar with the art.

Instead of the alkali metal hydroxides other alkaline salts such as potassium carbonate, sodium bicarbonate, sodium carbonate, etc. can be used. In place of sulphuric acid any other suitable acid stronger than silicic acid can be used.

According to the precise proportions given in the foregoing examples, the final reaction product will be alkaline to phenolphthalein. Such proportions are the most advantageous in making base exchange gel zeolites for water softening.

The use of additional alkali such as caustic soda or alkaline salts such as the carbonates without the use of acid or with the use of insufficient acid to neutralize all of the additional alkali or alkaline salts will increase the alkali metal oxide content of the resulting base exchange silicate.

The use of additional acid such as sulphuric acid without the use of additional alkali or alkaline salts or with the use of insufficient alkali or alkiline salt to neutralize such acid, will result in the acid combining with some of the sodium oxide of the sodium silicate or sodium aluminate and will increase the amount of silica in the base exchange silicate. Sufficient acid should not be used so that the resulting reaction mixture is acid, since a base exchange silicate will not be formed in an acid medium.

In the preferred process of making the base exchange silicate the aluminum sulphate to which may have been added sulphuric acid is mixed with the sodium silicate to which may have been added sodium hydroxide and the resulting mixture is mixed with the sodium aluminate to form the base exchange silicate. But the sulphuric acid or the caustic alkali could be added at the time of mixing of the solutions. The alkali in whole or part could be added with the aluminate. The order of mixing the sodium silicate, the sodium aluminate and the aluminum sulphate could be changed or all three of these solutions and the acid and alkali could be mixed together simultaneously, but I have found that the best products for general water softening purposes are obtained by adding an aluminate solution to a previously made mixture of silicate and sulphate solutions as described in the specific examples given above.

The process of this invention has still another aspect. It is quite frequently desirable to regulate the acidity or alkalinity of the reaction mixtures before, during, or after the precipitation of the base exchange silicate. It is very advantageous to use in this connection sodium aluminate to decrease the acidity and aluminum sulphate to decrease the alkalinity. Instead of sodium aluminate other alkaline compounds of amphoteric metals can be used and instead of aluminum sulphate other salts of amphoteric metals can be used. This method of regulation is very advantageous because it will result in the addition of more aluminum oxide or other amphoteric metal oxide to the reaction mixture which is derived from a different source than the amphoteric metal oxide present.

I claim:

1. The method of preparing base exchange materials which comprises mixing a solution of an alkali metal silicate with a solution of a non-alkaline compound of aluminum hydroxide and adding to said solution mixture a solution of an alkaline compound of aluminum hydroxide, the proportions and concentrations of said solutions being such as to form a jelly upon standing.

2. The process of preparing base exchange materials which comprises mixing a solution of sodium silicate with a solution of aluminum sulphate and adding to the mixture so obtained a solution of sodium aluminate.

3. The method of preparing base exchange materials which comprises mixing a solution of an alkali metal silicate with a solution of an acid compound of an amphoteric hydroxide and admixing with said solution mixture a solution of an alkali compound of an amphoteric hydroxide, said three solutions being in concentrations and proportions such as to form a jelly upon standing.

4. The process of preparing base exchange materials which comprises reacting together an alkali metal silicate, a solution of a non-alkaline compound of an amphoteric hydroxide and an acid and then adding to the reaction mixture, a solution of an alkaline compound of an amphoteric hydroxide.

5. In the manufacture of base exchange zeolites in the wet way, a process which comprises mixing solutions of an alkali metal silicate, an alkali, a non-alkaline compound of an amphoteric hydroxide and an acid and subsequently adding to the mixture a solution of an alkaline compound of an amphoteric hydroxide.

6. The process of preparing base exchange materials which comprises reacting together to form a gel alkali metal silicate, a solution of a non-alkaline compound of an amphoteric hydroxide, in acid and an alkali, and then adding to the reaction mixture a solution of an alkaline compound of an amphoteric hydroxide.

7. The method of preparing base exchange materials which comprises mixing a solution of sodium silicate and sodium hydroxide with a solution of aluminum sulphate and sulphuric acid and adding to the mixture a solution of sodium aluminate.

8. The process of preparing base exchange materials which comprises admixing an alkali silicate with a solution of a non-alkaline compound of an amphoteric hydroxide and then adding a solution of an alkaline compound of an amphoteric hydroxide, said solutions being in such proportions and concentrations as to form a jelly embracing a major portion of the reaction mixture, drying the jelly, granulating it and washing out soluble constituents.

9. The process of preparing base exchange materials which comprises admixing a solution of an alkali silicate with a solution of a non-alkaline compound of an amphoteric hydroxide and then adding a solution of an alkaline compound of an amphoteric hydroxide, said solutions being in such proportions and concentrations as to form a jelly embracing substantially all of the reaction mixture, drying the jelly, granulating it and washing out soluble constituents.

10. The process of preparing base exchange materials which comprises first mixing together a solution of a soluble silicate and a solution of a non-alkaline compound of an amphoteric hydroxide and then admixing with said solution mixture a solution of an alkaline compound of an amphoteric hydroxide in such proportion as to form a reaction mixture which is alkaline to phenolphthalein.

11. The process of preparing base exchange materials which comprises mixing together a solution of a soluble silicate, a solution of a non-alkaline compound of an amphoteric hydroxide and a solution of an alkaline compound of an amphoteric hydroxide, the acid components of the reaction being in such excess as to form soluble salts with the alkali combined with the amphoteric hydroxide and with a substantial portion of the alkali of the soluble silicate.

12. A method of increasing the porosity of precipitated base exchange silicates which comprises adding to the reacting mixture an acid and an alkali to provide soluble salts in excess of the amount resulting from the reaction which forms the base exchange silicate.

13. A method of regulating the hydrogen ion concentration of zeolite gel forming reaction mixtures resulting from the intermixture of an acid reacting solution of an amphoteric metal compound and an alkaline solution of hydrated silica, which comprises adding to said intermixture before gelation an alkaline reacting solution of an amphoteric metal compound.

14. A process of making water softening zeolites which comprises thoroughly mixing solutions of sodium silicate and aluminum sulfate of concentrations and in proportions forming a slow gelling solution mixture, admixing a solution of sodium aluminate with said solution mixture before gelation and then allowing the final mixture to set to a jelly.

In testimony whereof I have hereunto subscribed my name.

PERCY LASSELLE.

CERTIFICATE OF CORRECTION.

Patent No. 1,906,163.  April 25, 1933.

PERCY LASSELLE.

It is hereby certified that error appears in the printed specification of the above numbered patent requiring correction as follows: Page 3, line 110, claim 6, after "gel" insert "an", and line 112, for "in" read "an"; and that the said Letters Patent should be read with these corrections therein that the same may conform to the record of the case in the Patent Office.

Signed and sealed this 23rd day of May, A. D. 1933.

(Seal)

M. J. Moore.
Acting Commissioner of Patents.